United States Patent
Chu et al.

(10) Patent No.: US 10,928,933 B1
(45) Date of Patent: Feb. 23, 2021

(54) MOUSE DEVICE

(71) Applicant: Primax Electronics Ltd., Taipei (TW)

(72) Inventors: Chun-Lin Chu, Taipei (TW); Shu-An Huang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 16/725,217

(22) Filed: Dec. 23, 2019

(30) Foreign Application Priority Data

Oct. 18, 2019 (TW) .................................. 108137750

(51) Int. Cl.
*G06F 3/0354* (2013.01)
*G06F 3/0362* (2013.01)
*H01H 13/85* (2006.01)

(52) U.S. Cl.
CPC ........ *G06F 3/03543* (2013.01); *G06F 3/0362* (2013.01); *H01H 13/85* (2013.01); *G06F 2203/0333* (2013.01); *H01H 2227/032* (2013.01)

(58) Field of Classification Search
None
See application file for complete search history.

(56) References Cited

U.S. PATENT DOCUMENTS

| | | | |
|---|---|---|---|
| 2007/0251810 A1* | 11/2007 | Corcoran | G06F 3/03543 200/276.1 |
| 2011/0279371 A1* | 11/2011 | Ma | G06F 3/03543 345/163 |
| 2018/0113521 A1* | 4/2018 | Lai | G06F 3/03543 |
| 2018/0136728 A1* | 5/2018 | Unnikrishnan | H01H 13/85 |
| 2019/0042007 A1* | 2/2019 | Lu | G06F 3/03543 |

* cited by examiner

*Primary Examiner* — Amare Mengistu
*Assistant Examiner* — Sarvesh J Nadkarni
(74) *Attorney, Agent, or Firm* — Kirton McConkie; Evan R. Witt

(57) ABSTRACT

A mouse device includes a casing, a switch, a button, a travel distance adjustment and a knob structure. The button is exposed to a top side of the casing. A first end of the travel distance adjustment assembly is contacted with the button. A second end of the travel distance adjustment assembly includes an internal thread structure. The internal thread structure of the travel distance adjustment assembly is engaged with an external thread structure of the knob structure. While an operating part of the knob structure is rotated, the knob structure is not moved and the travel distance adjustment assembly is moved upwardly relative to the knob structure to push the force-exerted part upwardly. Consequently, a triggering speed of the switch is increased.

9 Claims, 4 Drawing Sheets

MOUSE DEVICE

FIELD OF THE INVENTION

The present invention relates to an input device, and more particularly to a mouse device.

BACKGROUND OF THE INVENTION

The widely-used input devices include for example mouse devices, keyboard devices or trackballs. As known, mouse devices are prevailing because they are very easy-to-use. When a mouse device is held by a user's palm, the user may move the mouse device to control movement of the cursor shown on the computer screen. In addition, by manipulating the buttons of the mouse device with the user's fingers, the user may click and select a desired icon shown on the computer screen or execute a corresponding function. As a consequence, most users and most manufacturers of the input devices pay much attention to the keyboard devices.

Please refer to FIGS. 1 and 2. FIG. 1 is a schematic perspective view illustrating the appearance of a conventional mouse device. FIG. 2 is a schematic cross-sectional view illustrating a portion of the conventional mouse device as shown in FIG. 1. The mouse device 1 comprises a casing 11, plural buttons 12, plural switches 13 and a circuit board 14. The plural switches 13 are aligned with the corresponding buttons 12. The circuit board 14 is electrically connected with the plural switches 13. Each button 12 comprises a triggering part 123, a fixing part 121 and a pressing part 122. The fixing part 121 and the pressing part 122 are located at two opposite sides of the button 12, respectively. The fixing part 121 of the button 12 is connected with the casing 11. A first end of the triggering part 123 is connected with the pressing part 122. A second end of the triggering part 123 is protruded toward the inner side of the casing 11. While the pressing part 122 of any button 12 is pressed down by the user, the pressing part 122 of the button 12 is swung downwardly relative to the fixing part 121 of the button 12 (i.e., a fulcrum). Consequently, the triggering part 123 is moved downwardly to trigger the corresponding switch 13, and the circuit board 14 issues a key signal.

Generally, after the pressing part 122 of the button 12 is pressed down for a travel distance larger than a specified distance, the switch 13 is triggered by the triggering part 123. In other words, the specified distance is the factor influencing the triggering speed of the switch 13. As known, in case that the travel distance of moving the triggering part 123 to trigger the switch 13 is shorter after the pressing part 122 of the button 12 is pressed down, the triggering speed of the switch 13 is faster. Conventionally, the travel distance of moving the triggering part 123 to trigger the switch 13 is fixed after the pressing part 122 of the button 12 is pressed down, and the travel distance is unable to be adjusted by the user. Consequently, the conventional mouse device 1 cannot meet the special requirements of the user. For example, the conventional mouse device 1 is not suitable for playing the electronic sports game.

In other words, the conventional mouse device needs to be further improved.

SUMMARY OF THE INVENTION

The present invention relates to a mouse device, and more particularly to a mouse device with an adjustable switch-triggering speed so as to meet the operating requirements of different users.

In accordance with an aspect of the present invention, a mouse device is provided. The mouse device includes a casing, a switch, a button, a travel distance adjustment and a knob structure. The switch is disposed within the casing. The button is exposed to a top side of the casing, and includes a triggering part, a pivotal part, a pressing part and a force-exerted part. The pivotal part is pivotally coupled to the casing and arranged between the pressing part and the force-exerted part. A first end of the triggering part is connected with the pressing part. A second end of the triggering part is protruded toward an inner side of the casing so as to trigger the switch. The travel distance adjustment assembly is disposed within the casing. A first end of the travel distance adjustment assembly is contacted with the force-exerted part. A second end of the travel distance adjustment assembly includes an internal thread structure. The knob structure includes an operating part, a rotating shaft and an external thread structure. The operating part is exposed outside the casing. The external thread structure is formed on the rotating shaft. A first end of the rotating shaft is connected with the operating part. A second end of the rotating shaft is protruded toward the inner side of the casing. Consequently, the external thread structure and the internal thread structure are engaged with each other. While the operating part is rotated, the knob structure is not moved and the travel distance adjustment assembly is moved upwardly relative to the knob structure to push the force-exerted part upwardly, so that the pressing part is swung downwardly and a triggering speed of the switch is increased.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
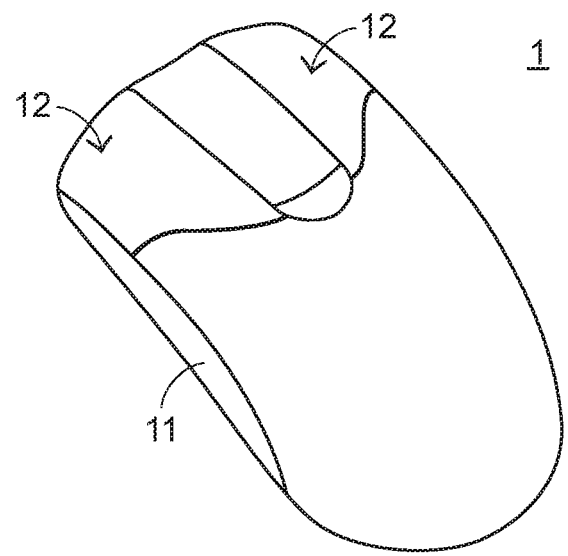
FIG. 1 is a schematic perspective view illustrating the appearance of a conventional mouse device.
Figure 2:
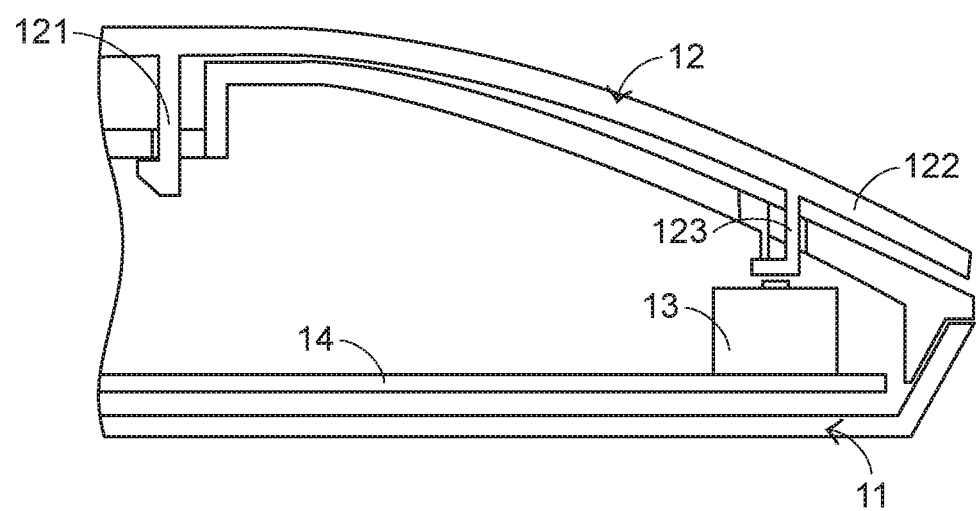
FIG. 2 is a schematic cross-sectional view illustrating a portion of the conventional mouse device as shown in FIG. 1.

The embodiments of present invention will be described more specifically with reference to the following drawings. Generally, in the drawings and specifications, identical or similar components are designated by identical numeral references. For well understanding the present invention, the elements shown in the drawings are not in scale with the elements of the practical product. In the following embodiments and drawings, the elements irrelevant to the concepts of the present invention or the elements well known to those skilled in the art are omitted. It is noted that numerous modifications and alterations may be made while retaining the teachings of the invention.

Figure 3:
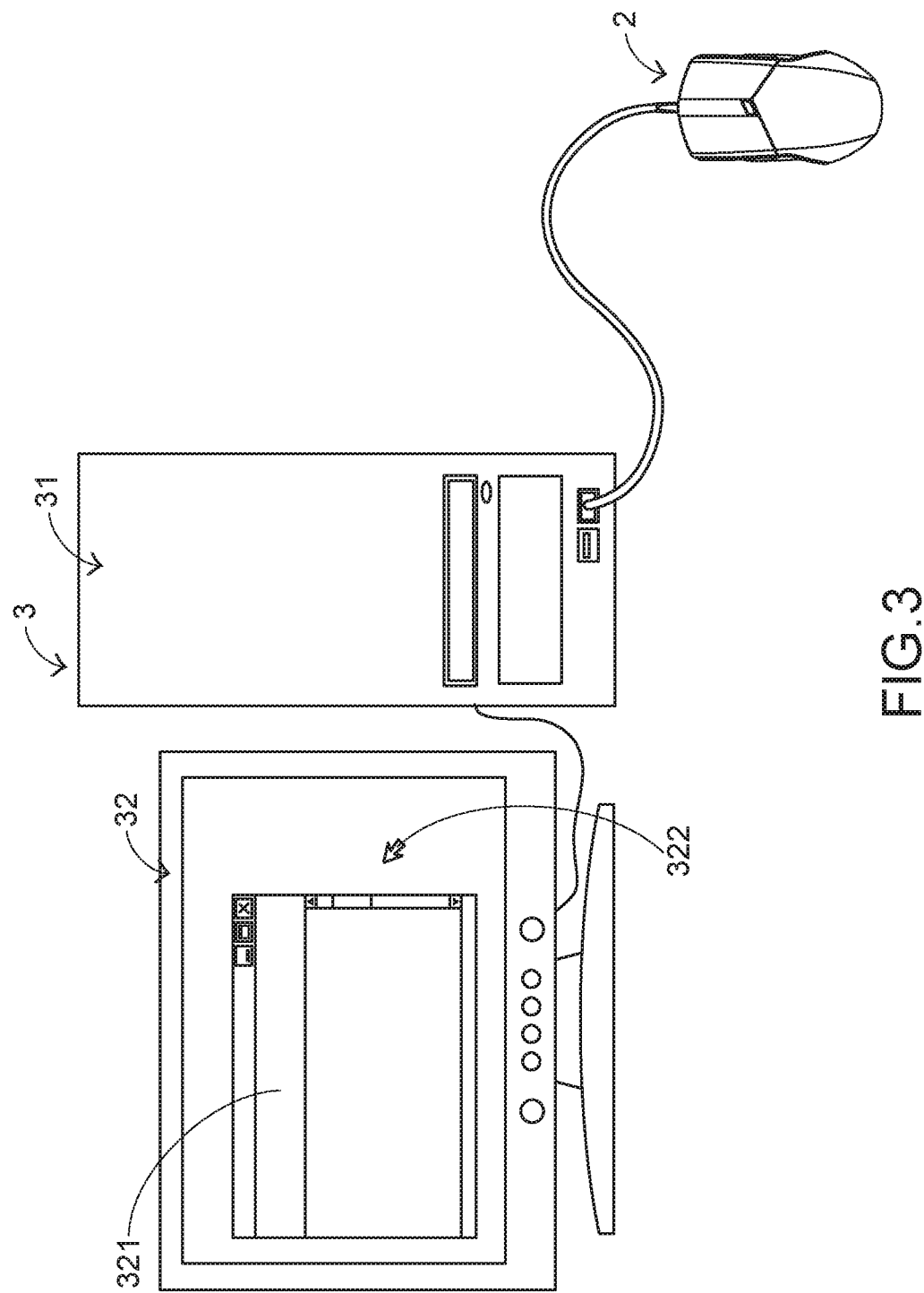
FIG. 3 schematically illustrates the connection between a mouse device and a computing device according to an embodiment of the present invention.
Figure 4:
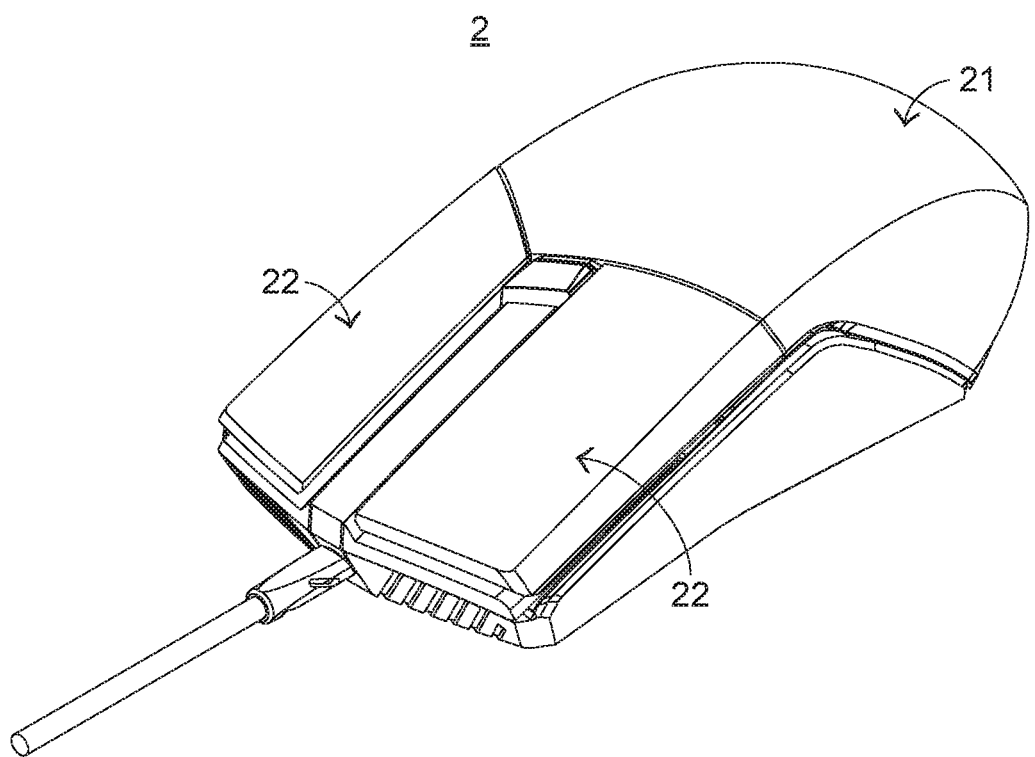
FIG. 4 is a schematic perspective view illustrating the appearance of the mouse device according to the embodiment of the present invention.

Please refer to FIGS. 3 and 4. FIG. 3 schematically illustrates the connection between a mouse device and a computing device according to an embodiment of the present invention. FIG. 4 is a schematic perspective view illustrating the appearance of the mouse device according to the embodiment of the present invention. The computing device 3 comprises a computer host 31 and a computer screen 32. The computer host 31 is in communication with the mouse device 2 and the computer screen 32. In this embodiment, the computer host 31 is in communication with the mouse device 2 and the computer screen 32 in a wired transmission manner. Alternatively, the computer host is in communication with the mouse device and the computer screen in a wireless transmission manner. A graphic-based window 321 and a cursor 322 are displayed on the computer screen 32. When the user's palm holds the mouse device 3 to move the mouse device 2, the cursor 322 shown on the computer screen 32 is correspondingly moved by the computer host 31 according to the displacement amount of the mouse device 2. The implementation examples and principles of operating the mouse device to control the cursor on the computer screen are well known to those skilled in the art, and are not redundantly described herein.

Figure 5:
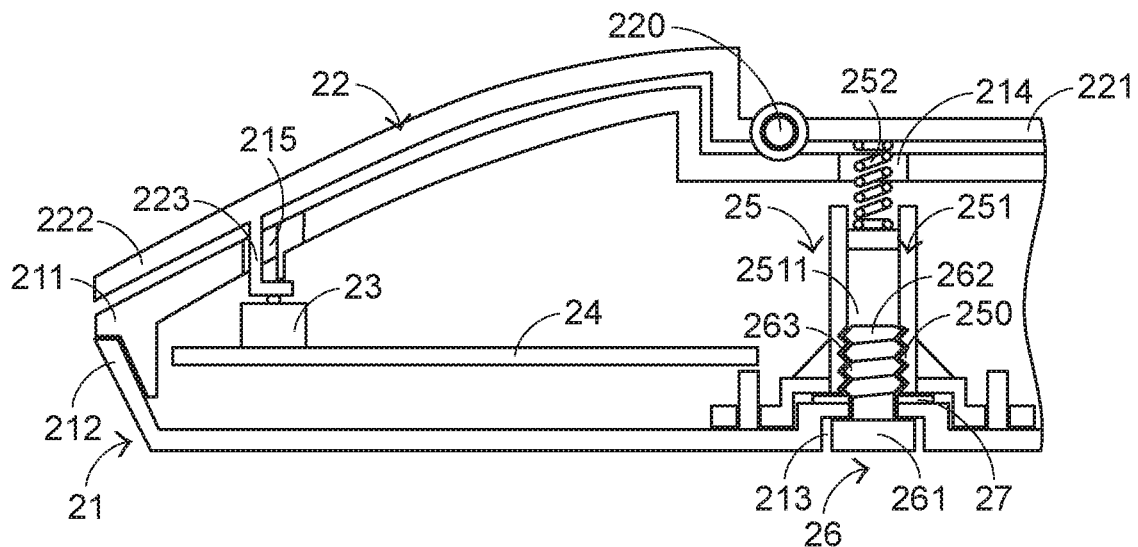
FIG. 5 is a schematic cross-sectional view illustrating a portion of the mouse device as shown in FIG. 4.

Please refer to FIG. 5. FIG. 5 is a schematic cross-sectional view illustrating a portion of the mouse device as shown in FIG. 4. For succinctness, only one button, one switch, one travel distance adjustment assembly and one knob structure are shown. The mouse device 2 comprises a casing 21, plural buttons 22, plural switches 23 corresponding to the buttons 22, plural travel distance adjustment assemblies 25, plural knob structures 26 and a circuit board 24. The plural switches 23 are electrically connected with the circuit board 24. Each button 22 is aligned with one switch 23, one travel distance adjustment assembly 25 and one knob structure 26.

The casing 21 comprises a top cover 211 and a base 212. The top cover 211 and the base 212 are combined together. The switches 23, the travel distance adjustment assemblies 25, the circuit board 24 and at least portions of the knob structures 26 are accommodated within an accommodation space between the top cover 211 and the base 212.

These buttons 22 are exposed outside the top cover 211 of the casing 21. Consequently, the buttons 22 can be operated and pressed by the user. Each button 22 comprises a pivotal part 220, a triggering part 223, a force-exerted part 221 and a pressing part 222. The force-exerted part 221 and the pressing part 222 are located at two opposite sides of the button 22, respectively. The pivotal part 220 of the button 22 is pivotally coupled to the top cover 211 of the casing 21. Moreover, the pivotal part 220 of the button 22 is arranged between the force-exerted part 221 and the pressing part 222. A first end of the triggering part 223 is connected with the pressing part 222. A second end of the triggering part 223 is protruded toward the inner side of the casing 21.

When the pressing part 222 of any button 22 is pressed down by the user, the pivotal part 220 of the button 22 is rotated relative to the top cover 211. Consequently, the pressing part 222 of the button 22 is swung downwardly and the triggering part 223 is moved downwardly to trigger the switch 23. Meanwhile, the circuit board 24, which is electrically connected with the switch 23, generates a button signal. The button signal is transmitted to the computing device 3, which is in communication with the mouse device 2. According to the button signal, the computing device 3 executes a corresponding command or function.

A first end of the travel distance adjustment assembly 25 pushes against the force-exerted part 221 of the button 22 upwardly. A second end of the travel distance adjustment assembly 25 comprises an internal thread structure 250. Each knob structure 26 comprises an operating part 261, a rotating shaft 262 and an external thread structure 263. The external thread structure 263 is formed on the rotating shaft 262. The operating part 261 is disposed and exposed outside the casing 21. Consequently, the operating part 261 can be operated and rotated by the user. A first end of the rotating shaft 262 is connected with the operating part 261. A second end of the rotating shaft 262 is protruded toward the inner side of the casing 21. Consequently, the external thread structure 263 and the internal thread structure 250 are engaged with each other. By rotating the operating part 261, the triggering speed of the corresponding switch 23 is adjustable. The associated principle will be described as follows.

In an embodiment, the casing 21 further comprises plural recesses 213. These recesses 213 are exposed outside the casing 21 and located under the base 212. The operating part 261 of the knob structure 26 is accommodated within the corresponding recess 213. Each travel distance adjustment assembly 25 comprises an adjustment structure 251 and an elastic element 252. The adjustment structure 251 comprises a threaded channel 2511. The internal thread structure 250 is formed in the threaded channel 2511. When the rotating shaft 262 of the corresponding knob structure 26 is inserted into the threaded channel 2511, the internal thread structure 250 is engaged with the external thread structure 263 on the rotating shaft 262. Moreover, the elastic element 252 is arranged between the corresponding button 22 and the corresponding adjustment structure 251. That is, the two ends of the elastic element 252 are contacted with the force-exerted part 221 of the button 22 and the adjustment structure 251, respectively.

Preferably but not exclusively, the casing 21 further comprises plural first perforations 214 corresponding to the plural travel distance adjustment assemblies 25 and plural second perforations 215 corresponding to the plural buttons 22. The elastic element 252 is penetrated through the corresponding first perforation 214. The triggering part 223 is penetrated through the corresponding second perforation 215. Optionally, the mouse device 2 further comprises plural locking rings 27 corresponding to the plural knob structures 26. Preferably but not exclusively, the locking rings 27 are E-shaped locking rings. Each locking ring 27 is locked on the rotating shaft 262 of the corresponding knob structure 26 and arranged between the corresponding travel distance adjustment assembly 25 and the base 212 of the casing 21. Since the knob structure 26 is fixed by the locking ring 27, the knob structure 26 is not detached from the casing 21.

Figure 6:
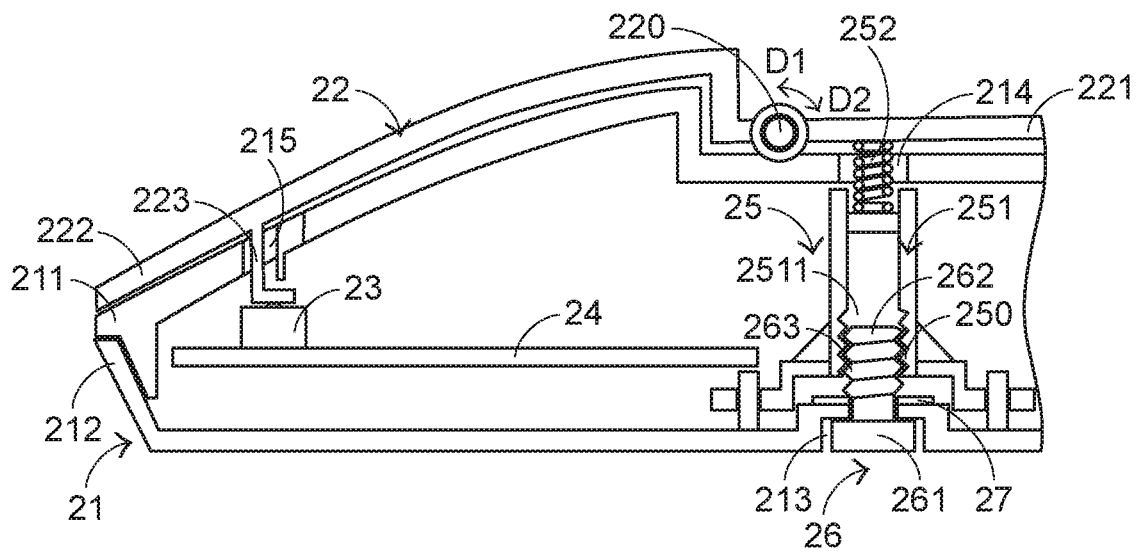
FIG. 6 is a schematic cross-sectional view illustrating a portion of the mouse device as shown in FIG. 5, in which the triggering speed of the switch is increased.

Hereinafter, a method of adjusting the triggering speed of the switch 23 of the mouse device 2 by the user will be illustrated with reference to FIGS. 5 and 6. FIG. 6 is a schematic cross-sectional view illustrating a portion of the mouse device as shown in FIG. 5, in which the triggering speed the switch is increased. For succinctness, only one button, one switch, one travel distance adjustment assembly and one knob structure are shown. For increasing the triggering speed of the switch 23 of the mouse device 2 as shown in FIG. 5, the user has to rotate the operating part 261 of the knob structure 26. Since the internal thread structure 250 of the travel distance adjustment assembly 25 is engaged with the external thread structure 263 of the knob structure 26, the adjustment structure 251 of the travel distance adjustment assembly 25 is moved upwardly relative to the knob structure 26 in response to the rotation of the operating part 261. As the adjustment structure 251 of the travel distance adjustment assembly 25 is moved upwardly, the elastic element 252 is moved upwardly to push the force-exerted part 221 of the button 22. While the force-exerted part 221 of the button 22 is pushed upwardly, the pivotal part 220 of the button 22 is rotated relative to the casing 21 in a direction D1 and the pressing part 222 of the button 22 is swung downwardly. Since the travel distance of moving the triggering part 223 to trigger the switch 23 is shortened after the pressing part 222 of the button 22 is pressed down, the triggering speed of the switch 23 is increased.

For decreasing the triggering speed of the switch 23 of the mouse device 2 as shown in FIG. 6, the user has to rotate the operating part 261 of the knob structure 26 in a reverse direction. Since the internal thread structure 250 of the travel distance adjustment assembly 25 is engaged with the external thread structure 263 of the knob structure 26, the adjustment structure 251 of the travel distance adjustment assembly 25 is moved downwardly relative to the knob structure 26 in response to the rotation of the operating part 261. As the adjustment structure 251 of the travel distance adjustment assembly 25 is moved downwardly, the force of the elastic element 252 to push the force-exerted part 221 of the button 22 is decreased. Since the force applied to the force-exerted part 221 of the button 22 is decreased, the pivotal part 220 of the button 22 is rotated relative to the casing 21 in a direction D2 and the pressing part 222 of the button 22 is swung upwardly. Since the travel distance of moving the triggering part 223 to trigger the switch 23 is increased after the pressing part 222 of the button 22 is pressed down, the triggering speed of the switch 23 is decreased.

Especially, while the operating part 261 of the knob structure 26 is rotated, the knob structure 26 is only rotated but not moved upwardly or downwardly. That is, the position of the operating part 261 is kept unchanged, and the operating part 261 is not shrunk inwardly or protruded outwardly. Consequently, the operation convenience of the operating part 261 is enhanced, and the overall appearance of the mouse device 2 is not impaired.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all modifications and similar structures.

What is claimed is:

1. A mouse device, comprising:
   a casing;
   a switch disposed and is fixed within the casing;
   a button exposed to a top side of the casing, and comprising a triggering part, a pivotal part, a pressing part and a force-exerted part, wherein the pivotal part is pivotally coupled to the casing and arranged between the pressing part and the force-exerted part, a first end of the triggering part is connected with the pressing part, and a second end of the triggering part is protruded toward an inner side of the casing so as to trigger the switch;
   a travel distance adjustment assembly disposed within the casing, wherein a first end of the travel distance adjustment assembly is contacted with the force-exerted part, and a second end of the travel distance adjustment assembly comprises an internal thread structure; and
   a knob structure comprising an operating part, a rotating shaft and an external thread structure, wherein the operating part is exposed outside the casing, the external thread structure is formed on the rotating shaft, a first end of the rotating shaft is connected with the operating part, and a second end of the rotating shaft is protruded toward the inner side of the casing, so that the external thread structure and the internal thread structure are engaged with each other,
   wherein while the operating part is rotated, the knob structure is not moved and the travel distance adjustment assembly is moved upwardly relative to the knob structure to push the force-exerted part upwardly, so that the pressing part is swung downwardly, so that a travel distance of moving the triggering part to trigger the switch is shortened and a triggering speed of the switch is increased.

2. The mouse device according to claim 1, wherein the travel distance adjustment assembly comprises an adjustment structure, and the adjustment structure comprises a threaded channel, wherein the internal thread structure is formed in the threaded channel, and the rotating shaft is inserted into the threaded channel, so that the internal thread structure is engaged with the external thread structure.

3. The mouse device according to claim 2, wherein the travel distance adjustment assembly further comprises an elastic element, and the elastic element is arranged between the button and the adjustment structure, wherein two ends of the elastic element are contacted with the force-exerted part and the adjustment structure, respectively.

4. The mouse device according to claim 3, wherein the casing further comprises a perforation, and the elastic element is penetrated through the perforation.

5. The mouse device according to claim 1, wherein the casing comprises a top cover and a base, and the top cover and the base are combined together, so that the travel distance adjustment assembly and the switch are accommodated within an accommodation space between the top cover and the base.

6. The mouse device according to claim 5, wherein the casing further comprises a recess, wherein the recess is exposed outside the casing and located under the base, and the operating part is accommodated within the recess.

7. The mouse device according to claim 1, wherein the mouse device further comprises a locking ring, wherein the locking ring is disposed on the rotating shaft and arranged between the travel distance adjustment assembly and the casing, and the knob structure is fixed by the locking ring.

8. The mouse device according to claim 1, wherein the mouse device further comprises a circuit board, and the switch is installed on the circuit board and electrically connected with the circuit board, wherein when the switch is triggered, the circuit board generates a key signal.

9. The mouse device according to claim 1, wherein the casing comprises a perforation, and the triggering part is penetrated through the perforation.

\* \* \* \* \*